United States Patent
Danilevich et al.

(10) Patent No.: US 9,036,203 B2
(45) Date of Patent: May 19, 2015

(54) PRINT CONTROLLING APPARATUS, IMAGE FORMING APPARATUS, AND METHOD FOR FORMING IMAGE

(71) Applicants: Alexey Bronislavovich Danilevich, Moscow (RU); Ilya Vladimirovich Safonov, Moscow (RU)

(72) Inventors: Alexey Bronislavovich Danilevich, Moscow (RU); Ilya Vladimirovich Safonov, Moscow (RU)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 127 days.

(21) Appl. No.: 13/623,985

(22) Filed: Sep. 21, 2012

(65) Prior Publication Data
US 2013/0077106 A1    Mar. 28, 2013

(30) Foreign Application Priority Data

Sep. 22, 2011 (RU) ............................. 2011138830
Sep. 21, 2012 (KR) ..................... 10-2012-0104948

(51) Int. Cl.
   *G06K 15/02* (2006.01)
(52) U.S. Cl.
   CPC .......... *G06K 15/1849* (2013.01); *G06K 15/186* (2013.01); *G06K 2215/0082* (2013.01); *G06K 15/1864* (2013.01)
(58) Field of Classification Search
   None
   See application file for complete search history.

(56) References Cited

U.S. PATENT DOCUMENTS

| 5,734,756 | A | 3/1998 | Sherman et al. | |
| 6,226,015 | B1 * | 5/2001 | Danneels et al. | 345/473 |
| 6,761,422 | B2 | 7/2004 | Smith, II | |
| 6,791,714 | B1 | 9/2004 | Ishimura | |
| 6,882,447 | B1 * | 4/2005 | Nakajima et al. | 358/1.9 |
| 6,950,207 | B1 | 9/2005 | Saitoh | |
| 7,567,715 | B1 * | 7/2009 | Zhu et al. | 382/232 |
| 7,586,490 | B2 * | 9/2009 | McDaniel | 345/441 |
| 7,889,388 | B2 | 2/2011 | Kaneko et al. | |
| 8,024,648 | B2 * | 9/2011 | Foehr et al. | 715/200 |
| 8,437,514 | B2 * | 5/2013 | Wen et al. | 382/118 |
| 2005/0063749 | A1 | 3/2005 | Harris et al. | |
| 2005/0220355 | A1 * | 10/2005 | Sun et al. | 382/254 |
| 2005/0270549 | A1 | 12/2005 | Zhou et al. | |
| 2006/0230351 | A1 * | 10/2006 | Stehle et al. | 715/700 |
| 2008/0024617 | A1 * | 1/2008 | Cazier et al. | 348/222.1 |
| 2008/0075381 | A1 * | 3/2008 | Ishimaru | 382/266 |

(Continued)

FOREIGN PATENT DOCUMENTS

| EP | 1331591 | 7/2003 |
| JP | 2006-229695 | 8/2006 |
| KR | 1020120028201 | 3/2012 |

OTHER PUBLICATIONS

Extended European Search Report dated Jan. 1, 2014 issued in EP Application No. 12185521.7.

(Continued)

*Primary Examiner* — Kimberly A Williams
(74) *Attorney, Agent, or Firm* — Staas & Halsey LLP

(57) ABSTRACT

An image forming apparatus, a print controlling apparatus, and an image forming method using the same are provided. The image forming method includes extracting at least one graphical primitive from print data, forming an image by arranging the graphical primitive according to whether the extracted graphical primitives are close to each other or not, converting the formed image into a sketch image, modifying the print data by replacing the sketch image and some of the graphical primitives constituting the sketch image, and draft-printing using the modified print data.

23 Claims, 18 Drawing Sheets

(56) References Cited

U.S. PATENT DOCUMENTS

| | | |
|---|---|---|
| 2009/0195811 A1 | 8/2009 | Lee |
| 2009/0237681 A1 | 9/2009 | Ferlitsch |
| 2009/0290883 A1 | 11/2009 | Nakahara |
| 2010/0128287 A1 | 5/2010 | Harris et al. |
| 2010/0214614 A1 | 8/2010 | Ferlitsch et al. |
| 2010/0245925 A1 | 9/2010 | Hori |
| 2012/0062941 A1* | 3/2012 | Sasayama ............... 358/1.15 |
| 2012/0086970 A1* | 4/2012 | Takahashi ............... 358/1.13 |

OTHER PUBLICATIONS

Kang H Et Al: "Coherent Line Drawing", International Symposium on Non-Photorealistic Animation and Rendering, XX, XX, No. 5th, Aug. 4, 2007, pp. 43-50, XP002469944.

* cited by examiner (a)  (b)

FIG. 13
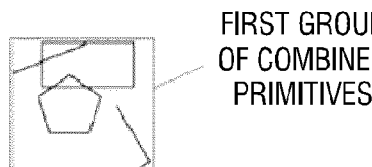
FIRST GROUP OF COMBINED PRIMITIVES
SECOND GROUP OF COMBINED PRIMITIVES
(a)
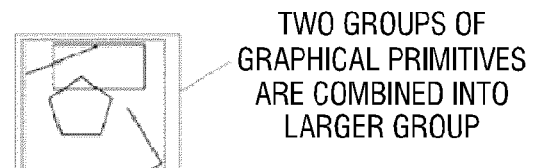
TWO GROUPS OF GRAPHICAL PRIMITIVES ARE COMBINED INTO LARGER GROUP
(b)

PRINT CONTROLLING APPARATUS, IMAGE FORMING APPARATUS, AND METHOD FOR FORMING IMAGE

CROSS-REFERENCE TO RELATED APPLICATIONS

This application claims priority under 35 U.S.C. §119 from Russian Patent Application No. RU2011138830, filed on Sep. 22, 2011 in the Russian Patent Office and Korean Patent Application No. 10-2012-0104948, filed on Sep. 21, 2012 in the Korean Intellectual Property Office, the disclosures of which are incorporated herein by reference in their entirety.

BACKGROUND OF THE INVENTION

1. Field of the Invention

Methods and apparatuses consistent with exemplary embodiments relate to a print controlling apparatus, an image forming apparatus, and a method of forming an image, and more particularly, to a print controlling apparatus, an image forming apparatus, and a method of forming an image using draft-printing.

2. Description of the Related Art

Modern print controlling apparatus and image forming apparatus have a so-called "draft-print" mode. The draft-print mode reduces quality of texts and images, but can save resources such as toner (ink). The draft-print technology generates print data for draft-printing in the print controlling apparatus and the image forming apparatus The print data may be expressed in a metafile format or a page description language (PDL). Microsoft enhanced metafile (EMF) is the representative of the print data of the metafile format. PostScript and PCL are examples of the PDL. A PDF format, which is intended to describe an original printing page, may be used as metafiles of various formats according to various operating systems.

The PDL and the metafile of various formats include a record (referred to as a "tag" or "command") indicating text data, bitmap image data, and vector graphics data. The printing page is changed by means of each metafile or PDL record (command). By this approach, a printing process may be controlled in the draft print mode.

A related-art technology is based on selective data pre-processing according to a type of data. For example, U.S. Patent Application Publication No. 20100214614 describes "contextual rendering" of "print elements". Similar approaches are described in U.S. Patent Application Publication Nos. 20100128287, 20050063749, and 20090290883.

Another approach is proposed in U.S. Patent Application Publication No. 20090195811. This approach configures content-based skipping of objects excluding all of these objects in a printing process.

However, there are problems in the related-art technology. In particular, as a rule, the draft-printing method is based on reduction in density of elements for expressing an image, which results in deterioration in image quality. Such related-art methods may cause great waste of toner since these methods paint images on a pixel area basis.

To solve these problems, draft-printing is performed using a sketch image. The sketch image refers to an image that looks like a picture drawn with a pencil. If draft printing is performed using the sketch image, visual quality of the original image is improved and sense of reality is not reduced so much.

In order to convert an image into such a sketch image, a picture included in a printing page is expressed by vector graphical elements. These elements are separable. In this case, it is impossible to process a whole image directly.

That is, in the related-art methods, problems arise if data which looks like a "picture" is represented after being wholly rasterized, being converted into a set of individual graphical elements, or being converted into vector graphical elements. That is, if a picture is represented as a set of independent elements, theses data cannot be processed as an integral picture. Since the data is applied to the picture as a whole rather than as individual elements, most of the toner-saving rules proposed in the above-mentioned patent applications is useless in this case.

Also, vector-based composite graphics may cause problems in an application of independent image printing rules, and also, a similar problem arises when one tries to convert such composite graphics into a sketch image.

The conversion into the sketch image is not applied to a primitive represented by a small rasterized image, that is, a line with one pixel width. That is, since the conversion into the sketch image is applied to only the whole picture, there is a demand for a method for combining graphical primitives into a group in order to generate a picture with the graphical primitives.

SUMMARY OF THE INVENTION

One or more exemplary embodiments provide a print controlling apparatus, an image forming apparatus, and a method forming an image by performing draft-printing.

One or more exemplary embodiments also provide a print controlling apparatus, an image forming apparatus, and a method of forming an image, which support draft-printing with improved visibility, so that visibility of a draft-printed picture can be maintained and also toner (ink) can be saved.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image forming method including extracting graphical primitives from print data and streams of the print data, generating a picture by arranging the graphical primitives according to geometrical vicinity of the extracted graphical primitives, converting the generated picture into a sketch image, modifying the print data or the streams of the print data by replacing the sketch image and some of the graphical primitives, and printing using the modified print data or the modified streams of the print data.

The foregoing and/or other features and utilities of the present general inventive concept may also be achieved by providing a system which prints a draft by means of picture-to-sketch conversion and implements according to an image forming method, the system including a record analysis unit to analyze a print job or a print data stream record by separating graphical primitives from "other records" and to transmit the extracted graphical primitives to a graphical primitive grouping unit and a print job assembly unit, while the other records are transmitted to the print job assembly unit only, a graphical primitive grouping unit to receive the graphical primitives as a graphical primitive group for a picture sketching unit, to arrange them in the picture according to geometrical vicinity, and to transmit the picture, a picture sketching unit to receive the picture represented by the grouped graphical primitives and to convert the picture into a sketch by determining an edge of the picture and then transmit the sketch to the print job assembly unit, a print job assembly unit to receive the sketch from the picture sketching unit by replacement of the sketch and at least some of the graphical primitives and to transmit the modified print job to a rasterizing and printing unit, to receive the other records of the original print job, and to constitute the modified print job, and a rasterizing and printing unit to receive the modified print job, to rasterize and print tan image according to the received print job.

The foregoing and/or other features and utilities of the present general inventive concept may also be achieved by providing an image forming method including extracting at least one graphical primitive from print data, forming an image by arranging the graphical primitive according to a determination of whether the extracted graphical primitives are close to each other or not, converting the formed image into a sketch image, modifying the print data by replacing the sketch image and some of the graphical primitives constituting the sketch image, and draft-printing using the modified print data.

The forming the image may include detecting a bounding area of the extracted graphical primitive, and, when the detected bounding areas overlap each other, combining the graphical primitives the bounding areas of which overlap each other into the image.

The forming the image may include detecting an outer area of a bounding area of the extracted graphical primitive, determining whether a coordinate distance between the bounding areas of the extracted graphical primitives falls within a predetermined distance or not, and combining the graphical primitive into the image when the bounding areas overlap each other or when the coordinate distance between the bounding areas falls within the predetermined distance.

The converting may include rasterizing the image which is represented by a group of the at least one graphical primitive into a bitmap, and converting the bitmap into the sketch image.

The converting the image into the sketch image may include converting the bitmap into a monochrome image, detecting an edge of the monochrome image and generating a mask, and generating the sketch image by multiplying the bitmap image with the mask.

The converting the image into the sketch image may include detecting a bounding area of the graphical primitive and highlighting a contrast, and suppressing a color included in an inner area of the graphical primitive.

The modifying the print data may include modifying the print data in part by including an original graphical primitive, which is represented by horizontal and vertical lines, in the modified print data.

The foregoing and/or other features and utilities of the present general inventive concept may also be achieved by providing a print controlling apparatus which is connectable to an image forming apparatus, the print controlling apparatus including a user interface unit to receive a print command regarding a print job, an extraction unit to extract at least one graphical primitive from the print job, an image forming unit to form an image by arranging the graphical primitive according to a determination of whether the extracted graphical primitives are close to each other or not, a sketch image generation unit to convert the formed image into a sketch image, a print data generation unit to modify a print data by replacing the sketch image and some of the graphical primitives constituting the sketch image, and a communication interface unit to transmit the modified print data to the image forming apparatus.

The image forming unit may detect a bounding area of the extracted graphical primitive, and, when the detected bounding areas overlap each other, may combine the graphical primitives the bounding areas of which overlap each other into the image.

The image forming unit may detect a bounding area of the extracted graphical primitive, and may determine whether a coordinate distance between the bounding areas of the extracted graphical primitives falls within a predetermined distance or not, and the image forming unit may combine the graphical primitive into the image when the bounding areas overlap each other or if the coordinate distance between the bounding areas falls within the predetermined distance.

The sketch image generation unit may include a rendering unit to rasterize the image which is represented by a group of the at least one graphical primitive into a bitmap, a color conversion unit to convert the bitmap into a monochrome image, a mask generation unit to detect an edge of the monochrome image and generates a mask, and a multiplication unit to generate the sketch image by multiplying the bitmap image with the mask.

The sketch image generation unit may directly detect a bounding area of the graphical primitive and may suppress a color inside the bounding area of the graphical primitive.

The color conversion unit may convert the generated sketch image into a monochrome image, and the print data generation unit may generate the print data by replacing the bitmap image in the print job with the monochrome image.

The print data generation unit may modify the print data in part by including an original graphical primitive, which is represented by horizontal and vertical lines, in the modified print data.

The foregoing and/or other features and utilities of the present general inventive concept may also be achieved by providing an image forming apparatus including a communication interface unit to receive print data, an extraction unit to extract at least one graphical primitive from the print data, an image forming unit to form an image by arranging the graphical primitive according to a determination of whether the extracted graphical primitives are close to each other or not, a sketch image generation unit to convert the formed image into a sketch image, and an printing unit to modify the print data by replacing the sketch image and some of the graphical primitives constituting the sketch image, and to perform draft-printing using the modified print data.

The image forming unit may detect a bounding area of the extracted graphical primitive, and, if the detected bounding areas overlap each other, may combine the graphical primitives the bounding areas of which overlap each other into the image.

The image forming unit may detect a bounding area of the extracted graphical primitive, and may determine whether a coordinate distance between the bounding areas of the extracted graphical primitives falls within a predetermined distance or not, and may combine the graphical primitive into the image when the bounding areas overlap each other or when the coordinates distance between the bounding areas falls within the predetermined distance.

The sketch image generation unit may include a rendering unit to rasterize the image which is represented by a group of the at least one graphical primitive into a bitmap, a color conversion unit to convert the bitmap into a monochrome image, a mask generation unit to detect an edge of the monochrome image and generates a mask, and a multiplication unit to generate the sketch image by multiplying the bitmap image with the mask.

The sketch image generation unit may directly detect a bounding area of the graphical primitive and may suppress a color inside the bounding area of the graphical primitive.

The printing unit may modify the print data in part by including an original graphical primitive, which is represented by horizontal and vertical lines, in the modified print data.

The foregoing and/or other features and utilities of the present general inventive concept may be achieved by providing a computer readable medium which records a code for an image forming method of a print controlling apparatus which is connectable to an image forming apparatus, the image forming method including receiving a print command regarding a print job, extracting at least one graphical primitive from the print job, forming an image by arranging the graphical primitive according to a determination of whether the extracted graphical primitives are close to each other or not, converting the formed image into a sketch image, modifying the print data by replacing the sketch image and some of the graphical primitives constituting the sketch image, and transmitting the modified print data to the image forming apparatus.

The foregoing and/or other features and utilities of the present general inventive concept may be achieved by providing an image forming apparatus including an extraction unit configured to extract one or more graphical primitives from print data of a print job, an image forming unit configured to form an image by arranging the one or more graphical primitives according to a determination of whether the extracted graphical primitives are disposed close to each other, a sketch image generation unit configured to convert the formed image into a sketch image, and a print data generation unit configured to modify the print data by replacing the sketch image and a portion of the graphical primitives constituting the sketch image.

The image forming apparatus may further include a printing unit to print an image corresponding to the modified print data on a print medium.

The foregoing and/or other features and utilities of the present general inventive concept may be achieved by providing an image controlling apparatus including the above described image forming apparatus and a communication interface unit to transmit the modified print data to an external image forming apparatus to perform draft-printing using the modified print data.

The foregoing and/or other features and utilities of the present general inventive concept may be achieved by providing an image forming apparatus including a memory unit to store print data, and a control unit to extract one or more graphical primitives from the print data of a print job, to form an image by arranging the one or more graphical primitives according to one or more characteristics of the one or more extracted graphical primitives, to convert the formed image into a sketch image, and to modify the print data by replacing the sketch image and a portion of the graphical primitives constituting the sketch image, to correspond to draft-printing.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 13 is a view illustrating graphical primitives to be combined by iterating the combining process of FIG. 12;

DETAILED DESCRIPTION OF THE PREFERRED EMBODIMENTS

Figure 1:
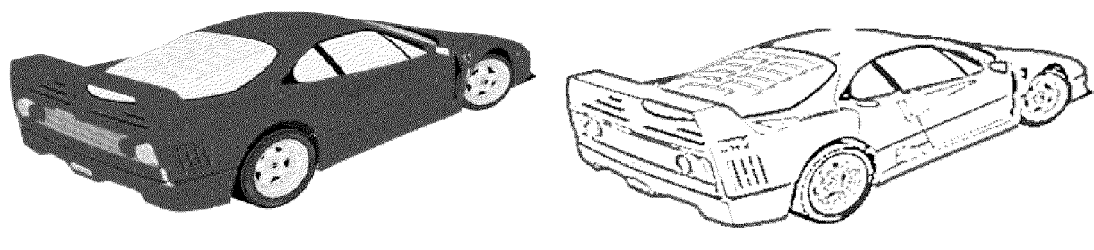
FIGS. 1A and 1B are views illustrating an example of a bitmap image and an example of a result of converting the bitmap image into a sketch image according an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIGS. 1A and 1B are views illustrating an example of a bitmap image (a) as a typical original picture and an example of a result (b) of converting the bitmap image into a sketch image according an exemplary embodiment of the present general inventive concept. The term "sketch" may designate an image that looks like an edge drawn with a pencil, which is separated from an original picture as illustrated in FIG. 1 showing a typical original picture and a sketch of the original picture.

Figure 2:
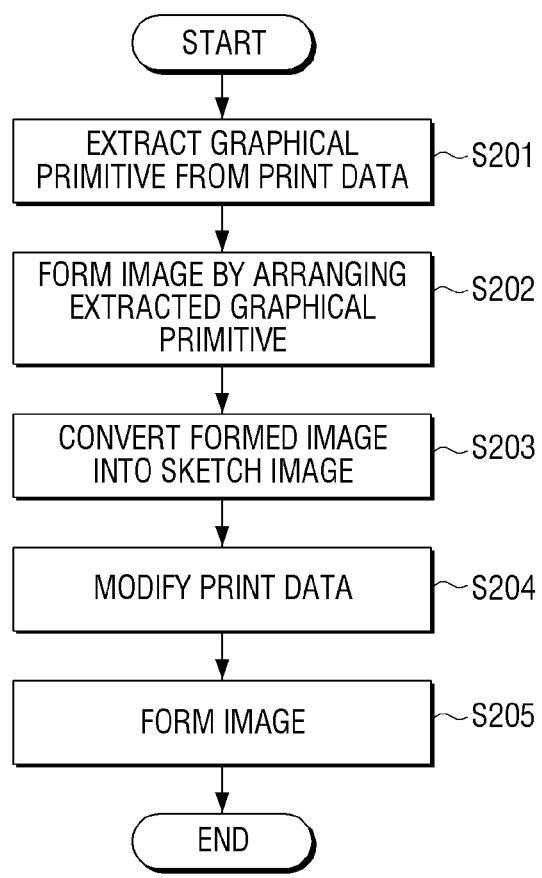
FIG. 2 is a flowchart illustrating an image forming method according to an exemplary embodiment of the present general inventive concept.

FIG. 2 is a flowchart illustrating an image forming method according to an exemplary embodiment of the present general inventive concept.

Referring to FIG. 2, the image forming method according to an exemplary embodiment includes extracting one or more graphical primitives from print data at operation S201 and forming an image by arranging the one or more graphical primitives according to a determination of whether the extracted graphical primitives are disposed close to each other at operation S202. The formed image is converted into a sketch image at operation S203. The print data is modified by replacing the sketch image and some of the graphical primitives constituting the sketch image at operation S204. Draft printing is performed using the modified print data to form an image at operation S205.

The above-described steps will be explained in detail below.

The extracting the one or more graphical primitives at operation S201 may include identifying the one or more graphical primitives included in the print data by examining a metafile or a PDL record of the print data. The identified one or more graphical primitives are extracted from the print data for an additional process to be performed at operation S202. The extracted graphical primitive may be represented by a vector graphical element and/or a bitmap image.

The forming the image by arranging the one or more graphical primitives at operation S202 may include generating the image by arranging the one or more graphical primitives based on geometrical vicinity between the extracted graphical primitives.

The forming the image at operation S202 may be performed according to a 'geometrical analysis' on one or more relationships between the one or more graphical primitives. This operation may be performed according to a possibility that graphical primitive groups continuously generate a sketch image for a whole image. However, the grouping of the graphical primitives may not result in separation of elements of graphics.

At the operation S202, the extracted graphical primitives are grouped and combined into the image. The image formed by grouping the graphical primitives is converted into a sketch image.

The converting the image at operation S203 may include converting the formed image into a sketch image. That is, the converting method may be performed by generating an auxiliary bitmap. The image composed of the graphical primitive groups is converted into a bitmap image.

The sketch image is generated based on the bitmap image. All suitable algorithms applied hereto at this time may determine a line of an image in which contrasting junctions exist, and an algorithm to suppress a monotone color area may be applied.

At operation S204, the generated sketch image is stored in a metafile which describes the print data (or a page description language) as a new record. That is, the print data is modified by deleting a portion of an original record which describes the graphical primitives combined into the image. At this time, the record of the graphical primitives combined into the image is replaced with a record of the generated sketch image. An incomplete portion of the original image may be deleted if it is necessary to partially maintain the original graphical primitives. For example, those which are used to determine a border framework of the image are maintained.

The printing operation is performed using the modified print data at operation S205.

According to the present embodiment, the image forming method may further include processing a print spool file. A print page may be formed by an individual print job and may be represented by a metafile (an EMF format in the Window OS). One metafile exists in every page of a document to be printed and the image forming method according to the present disclosure may be applied to every page.

A sketch image may be generated for every page of the print document to perform draft printing. The image forming method according to the present disclosure may be applied to a metafile of a different format, for example, a PDF file, and also, may be extended to metafiles of other formats.

Figure 3:
FIG. 3 is a block diagram schematically illustrating a process of modifying an initial print job by a print controlling apparatus according to an exemplary embodiment of the present general inventive concept.

FIG. 3 is a block diagram illustrating a process of modifying an initial print job according to an exemplary embodiment of the present general inventive concept.

Referring to FIG. 3, an initial print job is modified according to a print job modifying process. The modified print job is a print job to be performed using print data modified according to the image forming method illustrated in FIG. 2.

Figure 4:
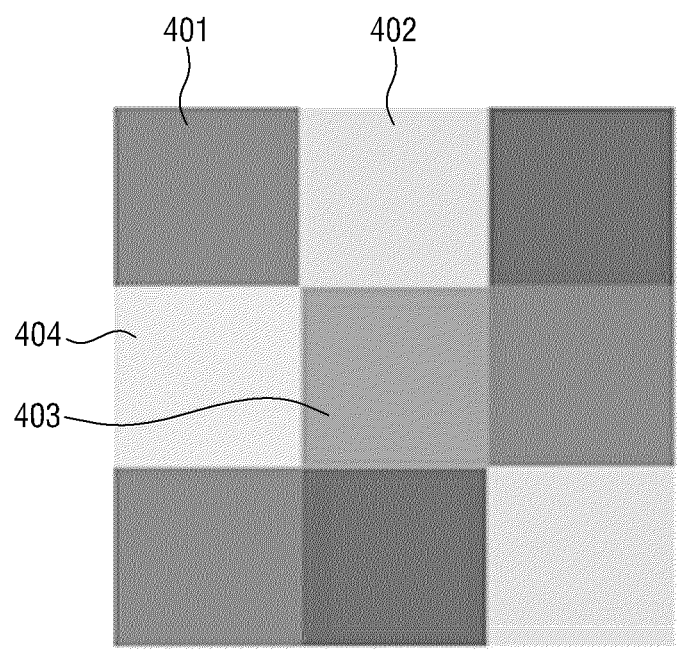
FIG. 4 is a view illustrating a case where graphical primitives of colored rectangles without borders cannot be separately sketched.

FIG. 4 is a view illustrating a case where graphical primitives of colored rectangles without borders cannot be separately sketched.

Referring to FIG. 4, the graphical primitives are filled with different colors, but have no border. That is, it can be seen that the graphical primitives are composed of rectangles of different colors without borders that make the image clearer. It is possible that each graphical primitive cannot be separately sketched. That is, the graphical primitives can be sketched only as a whole image. That is, if the graphical primitives are filled with colors without color frames as illustrated in FIG. 4, the graphical primitives can be sketched only as a whole image.

FIG. 4 illustrates areas 401 to 404 as rectangles that are filled with different colors. However, since each of the first to the fourth areas has no frame, the graphical primitives illustrated in FIG. 4 can be sketched only as a whole image. In other words, if inner colors are removed, the whole image disappears. It is impossible to generate a colored grid which is a goal of the generation of the sketch image.

Figure 5:
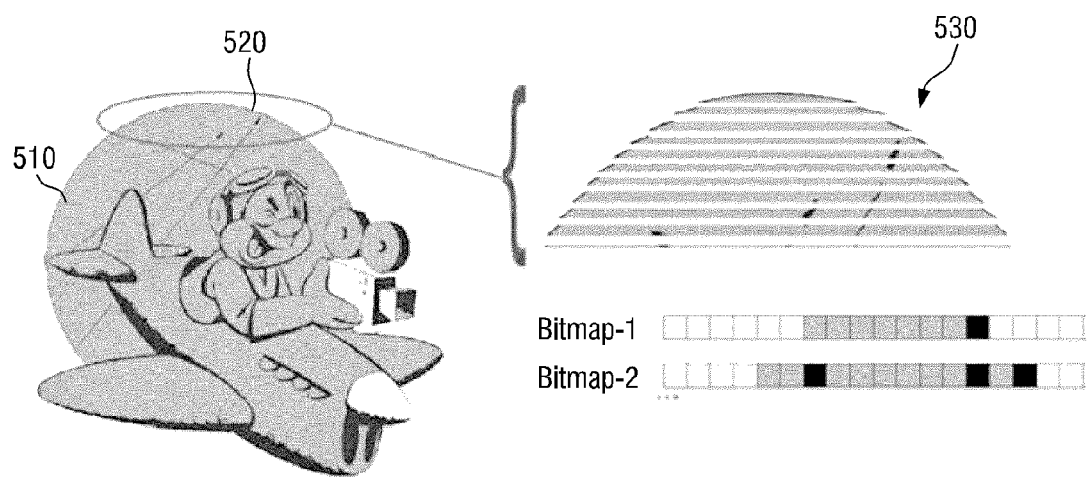
FIG. 5 is a view illustrating a case where graphical primitives composed of a primitive bitmap set which includes pixels in one row cannot be separately sketched.

FIG. 5 is a view illustrating a case where graphical primitives composed of a primitive bitmap set which includes pixels in one row cannot be separately sketched.

Referring to FIG. 5, it can be seen that a single line of pixels constituting an image expresses an image that is composed of a combination of small capacity rasterized bitmaps. That is, each line may be represented by each record in a metafile. The whole image is necessary for sketch, but a random metafile record is not necessary to understand the whole image clearly. That is, the row of these pixels cannot be sketched separately.

Similar situation may occur if a picture is composed in a linocut method, for example, is composed of vector graphics colored straight lines.

Likewise, if a combination of any graphical primitives occurs, for example, if there is a vector graphical element overlapping the bitmap, the vector graphical element cannot be converted into a sketch image separately.

As a result, the operation of converting the image into the sketch image may be applied to the whole image. The conversion into the sketch image may not be applied to individual graphical primitives. However, it is possible that the individual primitives can be represented by the bitmap image, but this may be selectively applied. Therefore, it is necessary to group the graphical primitives to form the image.

The "image" recited herein may refer to a combination of 2D graphical elements (dots, spots, lines, and shapes) which are visually perceived by human's eyes as a whole.

Figure 6:
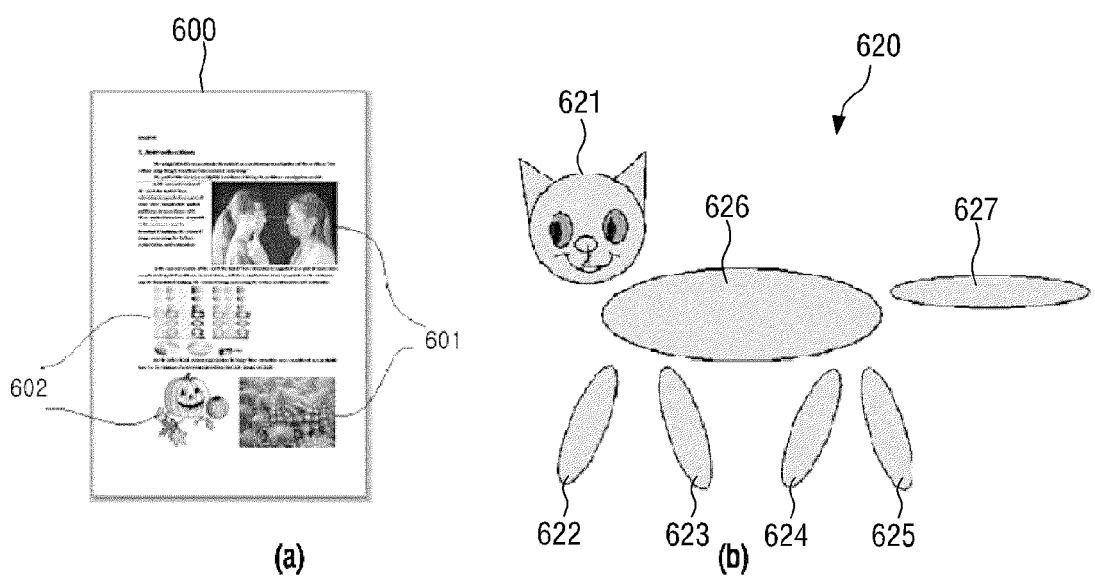
FIG. 6 is a view illustrating image determination according to visual perception.

FIG. 6 is a view illustrating image determination according to visual perception. FIG. 6 illustrates an image (a) of a print page which includes 4 pictures according to perception by humans' eyes. In the print page (a), only two pictures 601 are bitmap images, whereas the other two images 602 are vector graphics composed of separate graphical primitives-lines and elemental shapes.

Also, FIG. 6 illustrates an image (b) including a plurality of separate graphical elements 621 to 627 which are located slightly away from one another. However, if the picture of the image (b) is perceived by human's eyes, existence of the plurality of graphical elements is perceived as a single picture. That is, the human's eyes can naturally group the scattered graphical elements 621 to 627 into the image.

That is, integrity (integrating) of graphical elements of an image is a key function for grouping the graphical elements. The main feature of the geometrical primitives grouping of the present disclosure is grouping individual graphical elements based on geometrical vicinity. If the primitives overlap one another or are disposed close to each other, the graphical primitives may be grouped into the image.

The graphical primitives may be provided with a description in the form of geometrical parameters according to the present embodiment of the present general inventive concept. Such a description can be arbitrary, but it may include at least geometrical coordinates of the elements which enable calculation of localization on a plane. Such geometrical parameters on the bitmap include coordinates of vertices of a rectangular area of the image. From among the vector graphical elements, a radius of a circumference, center coordinates, and coordinates of apexes of a polygon and poly-lines should be calculated. That is, the geometrical coordinates may be expressed in any measurement unit (meters, millimeters, or pixels). For example, according to an exemplary embodiment, the pixels may be used as a measurement unit of the geometrical coordinates of the graphical primitives.

Figure 7:
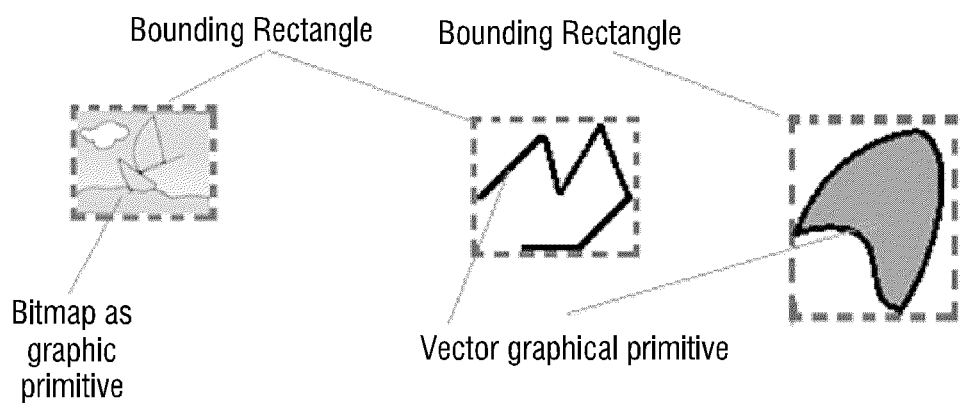
FIG. 7 is a view illustrating examples of localization areas for graphical primitives according to an exemplary embodiment of the present general inventive concept.

FIG. 7 is a view illustrating localization areas for graphical primitives according to an exemplary embodiment of the present general inventive concept.

Referring to FIG. 7, bounding rectangles of a bitmap image as a graphical primitive (on the left drawing of FIG. 7) and vector graphical primitives (on the center and right drawings of FIG. 7) are defined as localization areas. In this way, a bounding area is defined by bounding the graphical primitive. According to an exemplary embodiment, this bounding area may be represented by a bounding rectangle or a bounding box. When the bounding areas are combined into the image, these bounding areas may be used to compare the graphical primitives with one another. It is possible that any other polygon may be used to define such a bounding area.

The bounding rectangle is illustrated as an exemplary shape since it requires the simplest numerical value for geometrical operations, and thus it will be mainly described.

The graphical primitives, which are grouped into the image, are configured so that the bounding areas overlap one another or are disposed close to one another. The following rules may be applied according to an exemplary embodiment.

If the bounding areas (limited rectangles) overlap each other (see FIG. 8) or if the bounding areas are placed closer to each other than a predetermined allowable distance (see FIG. 9), the pair of graphical primitives may be regarded as overlapping each other.

According to an embodiment of the present general inventive concept, the allowable distance may be set separately for each of the two coordinates and may be calculated from a side surface of the rectangle. It is analyzed whether the two bounding rectangles overlap each other on a plane. This analysis is an analysis of geometrical vicinity.

The process of combining the graphical primitives according to the vicinity of the bounding areas of the graphical primitives in this way is an iterative process. The graphical primitives are gathered in a specific group and the gathered groups are gathered in a larger group.

Figure 8:
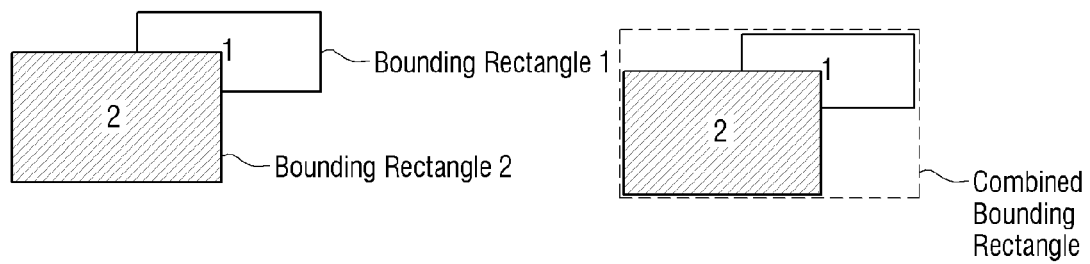
FIG. 8 is a view illustrating a method of forming a new bounding area by combining graphical primitives if localization areas are overlapped with each other according to an exemplary embodiment of the present general inventive concept.

Referring to FIG. 8, the two graphical primitives overlap each other and bounding rectangles 1 and 2 including the two graphical primitives are combined with each other by one iteration so that one bounding rectangle is formed (illustrated by dotted lines).

Figure 9:
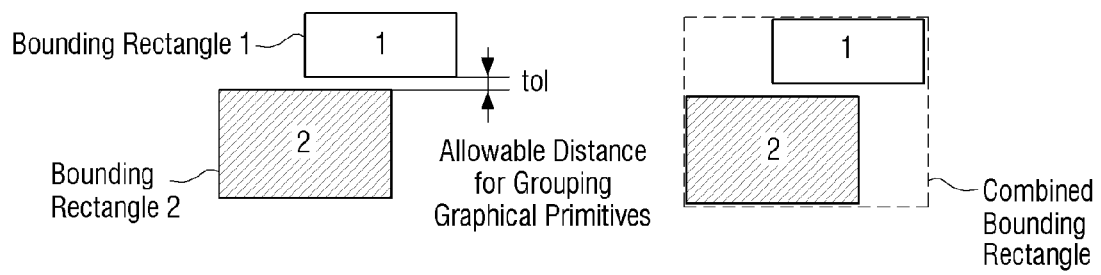
FIG. 9 is a view illustrating a method of forming a new bounding area by combining graphical primitives if localization areas are located within a threshold distance according to an exemplary embodiment of the present general inventive concept.

Referring to FIG. 9, the two graphical primitives are disposed close to each other within a predetermined distance, and bounding rectangles 1 and 2 including the two graphical primitives are combined with each other by one iteration so that one bounding rectangle is formed (illustrated by dotted lines).

The graphical primitives are iteratively gathered in the groups in this way so that a bounding rectangle for the whole image is formed. The bounding rectangle for the whole picture will be explained with reference to FIGS. 10 and 11 by way of an example.

Figure 10:
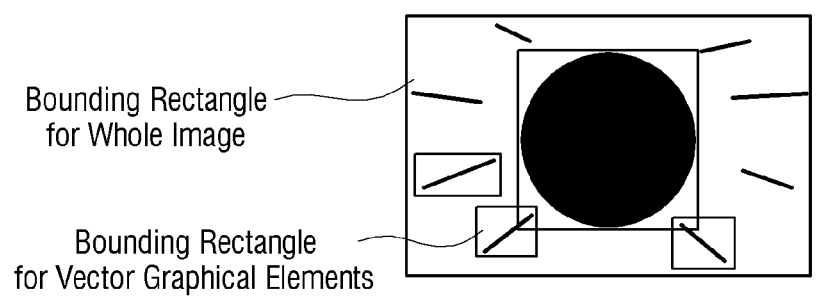
FIG. 10 is a view illustrating a bounding area for a whole image which is formed by combining graphical primitives according to an exemplary embodiment of the present general inventive concept.

FIG. 10 is a view illustrating a bounding area for a whole image which is formed by combining graphical primitives according to an exemplary embodiment of the present general inventive concept.

Referring to FIG. 10, bounding rectangles for vector graphical elements composed of a circle and straight lines are formed. The bounding rectangles for the vector graphical elements may overlap one another. For a certain element from among the vector graphical elements, no bounding rectangle may be formed. From among the straight lines illustrated in FIG. 10, a line that is not included in a bounding rectangle is illustrated. However, even the straight line that is not included in the bounding rectangle may be included in the bounding rectangle for the whole image. That is, the bounding rectangle for the whole image includes the vector graphical elements included in the bounding rectangles, and the vector graphical element that is not included in the bounding rectangle may be included in the bounding rectangle for the whole picture.

Figure 11:
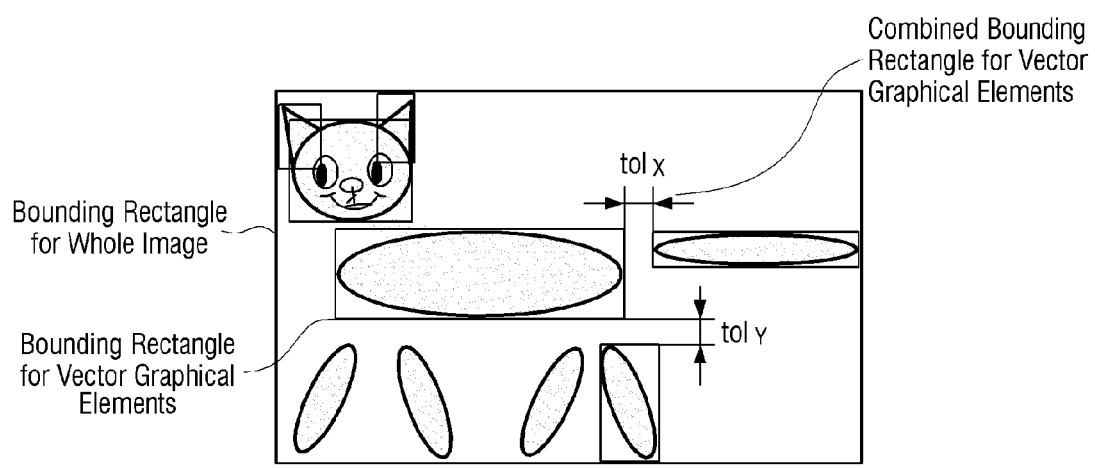
FIG. 11 is a view illustrating a bounding area for a whole image which is formed by combining graphical primitives of FIG. 6B.

Another example of the bounding rectangle for the whole picture (image) is illustrated in FIG. 11.

FIG. 11 is a view illustrating a bounding area for a whole image which is formed by combining graphical primitives of the image (b) of FIG. 6.

Referring to FIG. 11, vector graphical elements, such as a plurality of ovals, circles, triangles, and circular arcs, are includes in their respective bounding rectangles. A number of bounding rectangles overlap one another and certain bounding rectangles are disposed close to one another. The bounding rectangles that include vector graphical primitives disposed close to each other within predetermined distances 'tol x' or 'tol y' may be processed as belonging to one group.

Figure 12:
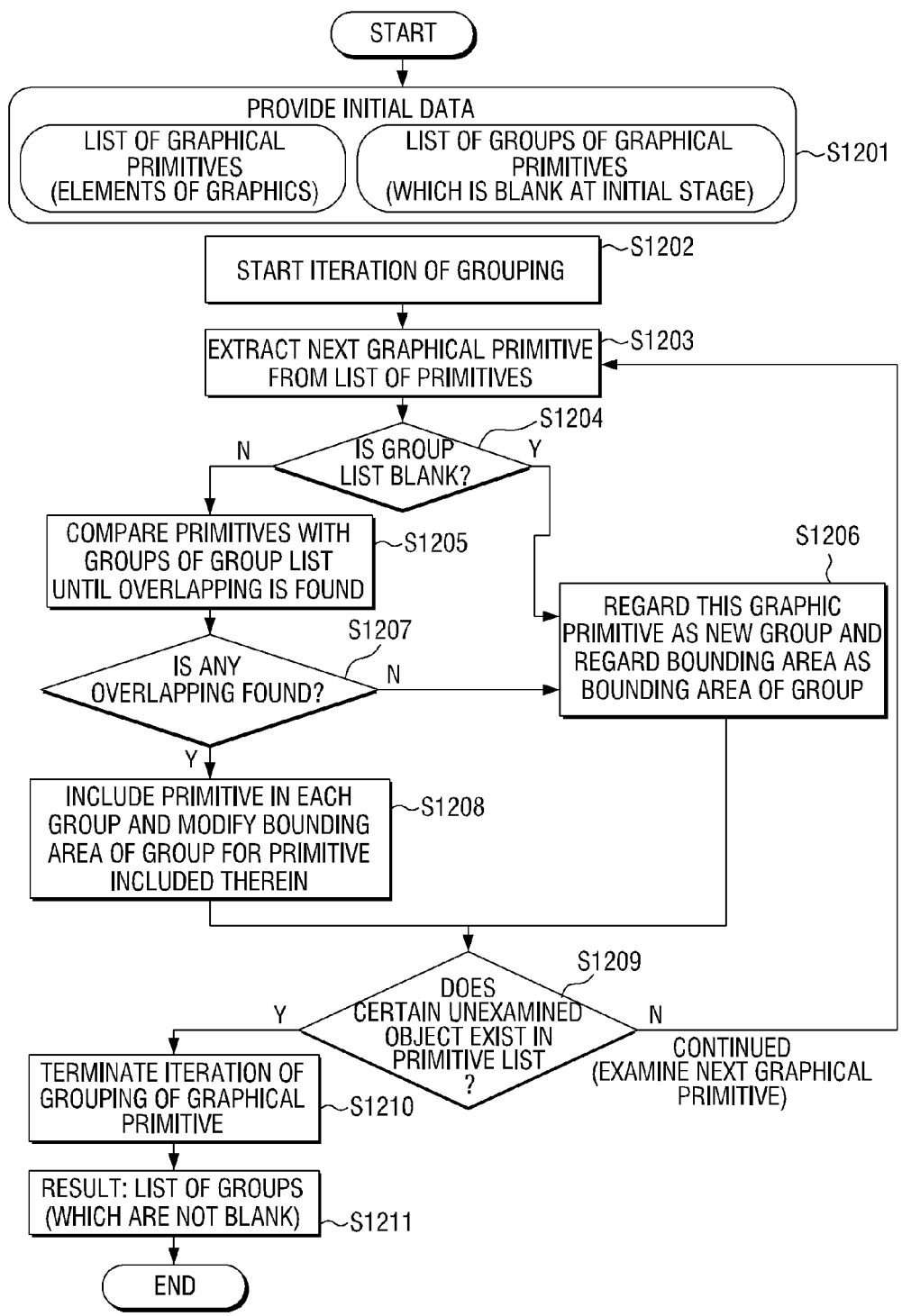
FIG. 12 is a flowchart illustrating a process of combining graphical primitives according to an exemplary embodiment of the present general inventive concept.

The method of grouping the graphical primitives as described above will be explained in detail with reference to FIG. 12. FIG. 12 is a flowchart illustrating a process of grouping graphical primitives using a list of graphical primitives and a list of groups of graphical primitives as initial data.

Operations of an iterative process of gathering a plurality of graphical primitives in a group based on geometrical vicinity according to an exemplary embodiment are as follows:

The grouping operation starts with an operation S1201 of displaying initial data. That is, the initial data is graphical primitives extracted from print data and groups of the graphical primitives, and is displayed as a list of the graphical primitives and a list of the groups of the graphical primitives.

Iteration of the grouping process starts at operation S1202. That is, the list of the groups of the graphical primitives is blank before the iteration starts and is filled when the grouping process is performed. This will be explained in detail below.

The graphical primitive is extracted from the primitive list to be compared with those that are included in the list of the groups at operation S1203.

It is determined whether the list of the groups of the primitives is blank or not at operation S1204. If the group list is blank at operation S1204-Y, the extracted graphical primitive is processed as a first group to be included in the list at operation S1206. Such newly included graphical primitive is only one element that belongs to the group. A border of the graphical primitive included in the group in this way is an initial bounding rectangle of the group.

After that, the operation of extracting a next graphical primitive from the list at operation S1203 resumes. If the list of the groups is not blank, the corresponding graphical primitive is compared with each group in the group list until the graphical primitive is founded to overlap another group at operation S1205. In this operation, an overlapped bounding rectangle may be analyzed.

If the extracted graphical primitive is not found to be overlapped with another group at operation S1207-N, it is determined that this graphical primitive does not belong to any group. In this case, this graphical primitive forms a new group in the group list at operation S1206. At this time, the bounding rectangle forms a bounding rectangle of the new group. In this case, it is determined whether a certain unexamined object exists in the primitive list at operation S1209. If there is an unextracted (or unexamined) object, the iteration of the grouping of the graphical primitives is terminated at operation S1210 and the group list which is not blank is displayed at operation S1211. That is, if all of the primitives existing in the list of the graphical primitives are processed, the iteration is completed. The final results combine the graphical primitives according to the geometrical vicinity, thereby displaying them as the list of the groups of the graphical primitives.

If an unextracted object does not exist in the primitive list, the operation of extracting a next graphical primitive from the list of the graphical primitives is performed at operation S1203.

If one of the examined primitives overlaps one of the groups, the primitive should be included in that group. The bounding rectangle of the group is modified. That is, the bounding rectangle is re-calculated in order to limit the new primitive included in the group. Accordingly, if the number of groups in the list does not increase, a new element may be added to one of the groups at operation S1206. The next operation is returning to the operation of extracting a next primitive from the list.

The above-described iteration process may be only a portion (one iteration) of the process of combining the graphical primitives into the image. If the groups overlap each other as a result of the graphical primitives, the groups may be combined into a larger group (see FIG. 13). The entire grouping process may include several iterations as described above.

FIG. 13 is a view illustrating graphical primitives which are combined by iterating the combining process of FIG. 12.

FIG. 13 illustrates an image (a) including a first group of primitives combined by a first bounding rectangle, and a second group of primitives combined by a second bounding rectangle. FIG. 13 also includes an image (b) to illustrate a case where the first bounding rectangle and the second bounding rectangle are disposed close to each other and thus a single bounding rectangle in which the two groups are combined with each other is formed.

The entire operations of forming an image by grouping graphical primitives will be explained in detail with reference to FIG. 14.

Figure 14:
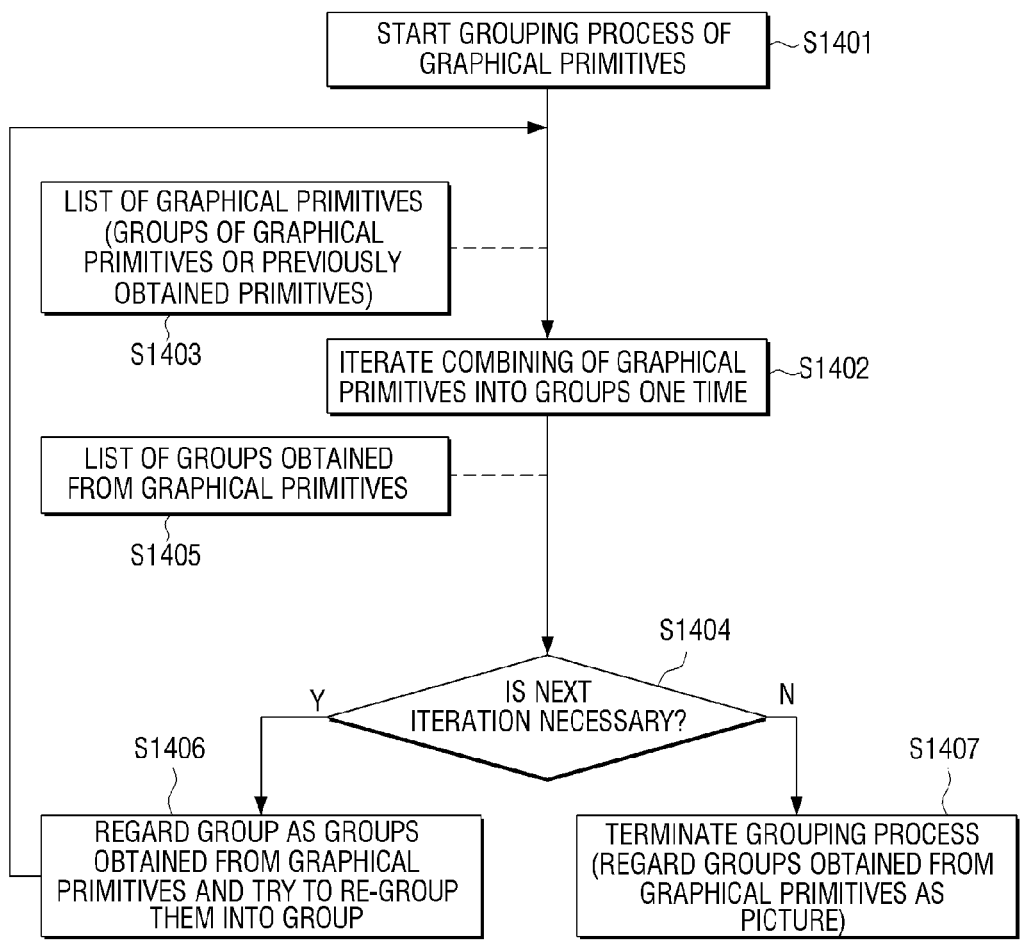
FIG. 14 is a flowchart illustrating a process of generating an image by arranging graphical primitives according to an exemplary embodiment of the present general inventive concept.

FIG. 14 is a flowchart illustrating a process of generating an image by arranging graphical primitives according to an exemplary embodiment of the present general inventive concept.

Referring to FIG. 14, operations of grouping graphical primitives into an image are as follows:

Grouping of all of the graphical primitives provided along with their respective bounding rectangles starts at operation S1401. The process of combining the graphical primitives into groups is iterated at operation S1402. The grouping process of the graphical primitives is iterated one time and a result indicating a list of the groups of the graphical primitives is displayed. A detailed description has been provided above and thus is omitted. That is, the graphical primitives are listed according to the iterating process and are regarded as candidates to be grouped into the image at operation S1403.

A condition for terminating the grouping process is identified at operation S1404. The condition to terminate the grouping process is identified according to a determination of whether the two following rules are met or not.

When the list is included in one group, all of the primitives are combined into the image and it is determined that the grouping process is not required any more.

It is determined that the condition is met in a case where the number of groups generated during the iteration of the individual process is the same as the number of initial graphical primitives (or the number of previous groups). In this case, the examined graphical primitives are rather located far away from each other until now and thus cannot be combined with one another. As a result, it is determined that the graphical primitives are represented by separate pictures.

As a result of the above-described process, several groups of (at least one) graphical primitives combined may be obtained. All initial graphical primitives are represented as belonging to some of these groups. The grouping method according to the present disclosure does not strictly prescribe whether a description form should be used to represent a relationship between graphical elements. For example, some table in the exemplary embodiment of the present disclosure is used to explain the parameters of all of the graphical primitives and geometrical elements of the group as well as whether they belong to each other.

If the process should be continued at operation S1404-Y, the current group is regarded as a new graphical primitive at operation S1406 and is used as input data for next grouping iteration. Accordingly, new iteration refers to a process of combining previously generated groups at operation S1403 and a new list of the groups is generated at operation S1405.

Figure 15:
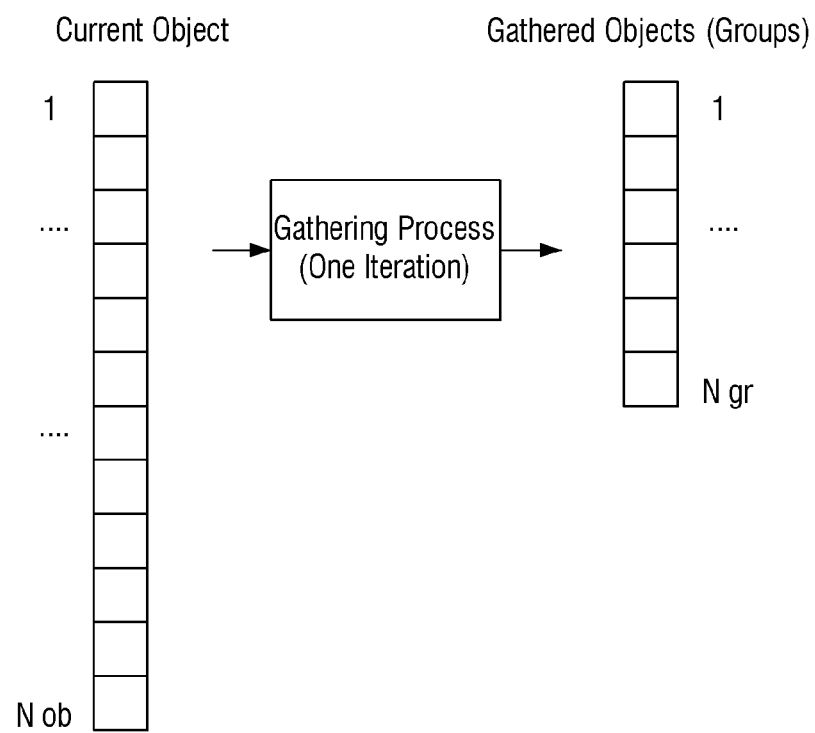
FIG. 15 is a view illustrating a method of reducing a number of graphical primitives by iterating a process of grouping graphical primitives according to an exemplary embodiment of the present general inventive concept.

As the operations are iterated, the total number of groups generated by combining the initial graphical primitives as illustrated in FIG. 15) is reduced. That is, referring to FIG. 15, the number of objects of initial graphical primitives is reduced as the gathering process is iterated.

FIG. 15 is a view illustrating a case to reduce a number of graphical primitives by iterating a process of grouping graphical primitives according to an exemplary embodiment of the present general inventive concept.

The initially extracted graphical primitives include objects 1 to $N_{ob}$. If the gathering process is iterated one time, the number of objects is reduced to 1 to $N_{gr}$. Preferably, $N_{ob}$ is greater than $N_{gr}$. If $N_{ob}$ is equal to $N_{gr}$, the grouping process is not performed.

In other words, when $N_{ob}$ is equal to $N_{gr}$, the gathering process is not iterated and the grouping process is terminated. Hereinafter, next operation if it is determined that the grouping process need not be iterated according to the condition for terminating the grouping process will be explained.

If the grouping process need not be iterated according to the terminating condition at operation S1404-N of FIG. 14, the last group in the graphical primitive list is represented as an image composed of the graphical primitives. The image composed of the graphical primitives finally grouped is used to convert an image into a sketch image at operation S1407 of FIG. 14.

Hereinafter, a print controlling apparatus and an image forming apparatus which perform the above-described method will be explained in detail.

Figure 16:
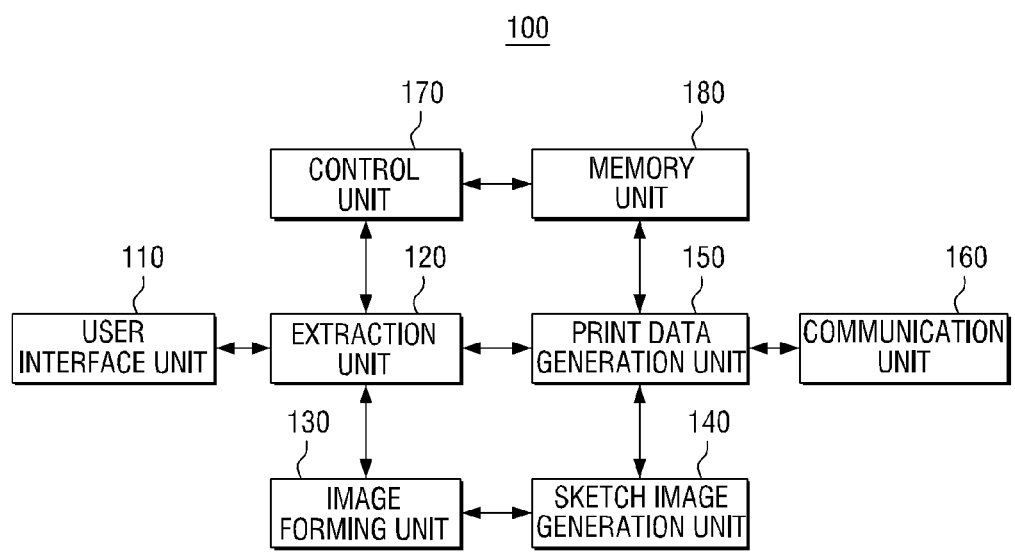
FIG. 16 is a block diagram illustrating a print controlling apparatus according to another exemplary embodiment of the present general inventive concept.

FIG. 16 is a block diagram illustrating a print controlling apparatus 100 according to an exemplary embodiment of the present general inventive concept. Referring to FIG. 16, the print controlling apparatus 100 includes a user interface unit 110, an extraction unit 120, an image forming unit 130, a sketch image generation unit 140, a print data generation unit 150, and a communication interface unit 160.

The print controlling apparatus 100 may include a control unit 170 to control components of the print controlling apparatus 100, for example, the user interface unit 110, the extraction unit 120, the image forming unit 130, the sketch image generation unit 140, the print data generation unit 150, and the communication interface unit 160 so that a function of the print controlling apparatus 100 can be performed according to an embodiment of the present general inventive concept. The print controlling apparatus 100 may also include a memory unit 180 to store data associated with the function of the print controlling apparatus 100. It is possible that the extraction unit 120, the image forming unit 130, the sketch image generation unit 140, and the print data generation unit 150 are included in the control unit 170 such that the control unit 170 can perform the corresponding functions thereof.

The user interface unit 110 receives a print command regarding a print job. The user interface unit 110 may include a display element to display a user interface to communicate with a user such that a user can input the print command. It is possible that the display element is a touch panel. It is also possible that the user interface unit 110 may include a key or button provided on a main body or housing of the print controlling apparatus 100 to input the print command. It is also possible that the print command can be received from an external device connectable to the print controlling apparatus 100 through a wired or wireless communication method and structure.

The extraction unit 120 extracts at least one graphical primitive from print data corresponding to the print job.

The image forming unit 130 forms an image by arranging the graphical primitives according to a determination of whether the extracted graphical primitives are close to each other within a geometrical distance. That is, the image forming unit 130 forms a whole image by grouping the graphical primitives which overlap each other or are disposed close to each other within a predetermined distance. The image forming unit 130 generates an image having the one or more graphical primitives by iterating the grouping of the graphical primitives.

The image forming unit 130 detects a bounding area of the extracted graphical primitive, and, when the detected bounding areas overlap each other, groups the graphical primitives by combining the graphical primitives in the overlapping bounding areas into the image.

The image forming unit 130 detects a bounding area of the extracted graphical primitive and determines whether a distance between the bounding areas of the extracted graphical primitives in a coordinate plane or system having at least two coordinates with respect to the image falls within a predetermined distance or not. When the bounding areas overlap each other or the coordinate distance between the bounding areas falls within the predetermined distance, the image forming unit 130 groups the graphical primitives by combining them into the image.

The sketch image generation unit 140 converts the image formed by the image forming unit 130 into a sketch image.

Figure 16A:
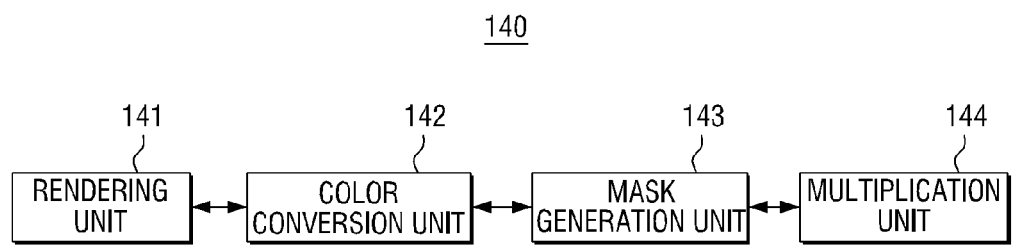
FIG. 16A is a view illustrating a sketch image generation unit of the print controlling apparatus of FIG. 16.
Figure 17:
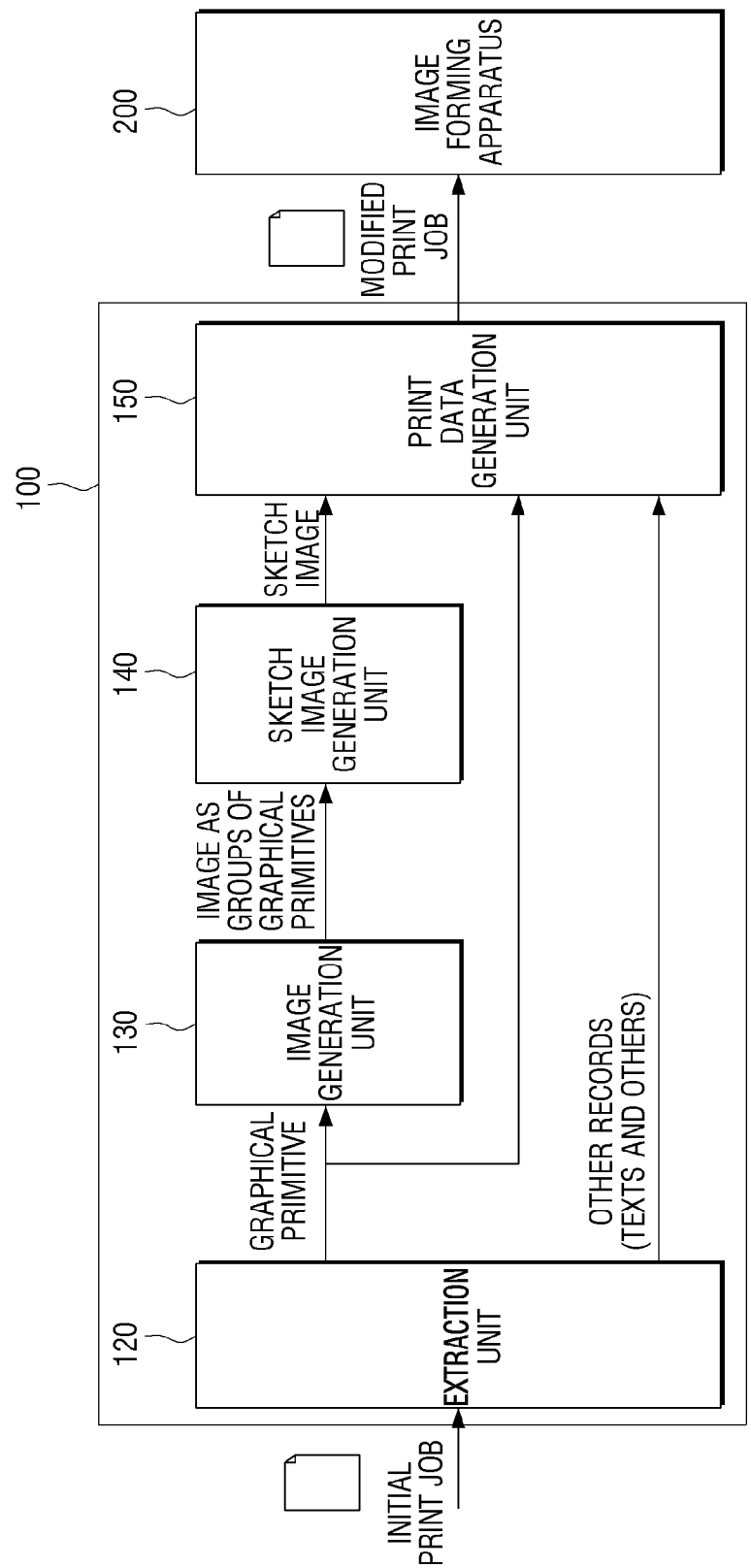
FIG. 17 is a block diagram illustrating the print controlling apparatus of FIG. 16 in detail.

The sketch image generation unit 140 will be explained in detail below. The sketch image generation unit 140 includes a rendering unit 141, a color conversion unit 142, a mask generation unit 143, and a multiplication unit 144 as illustrated in FIG. 16A. The rendering unit 141 rasterizes the image which is represented by a group of at least one graphical primitive into a bitmap. The color conversion unit 142 converts the rasterized bitmap into a monochrome image. The mask generation unit 143 detects an edge of the converted monochrome image, and generates a mask. The multiplication unit 143 multiplies the bitmap image with the mask, thereby generating the sketch image. The print data generation unit 150 modifies the print data by replacing the sketch image and some of the graphical primitives constituting the sketch image.

The sketch image converting process is performed by directly rasterizing a memory buffer image or an image which is obtained by combining the graphical primitives without being rasterized. That is, the approach without the image rasterization is applied when the image includes vector graphical primitives that do not overlap each other, and also has a border to be clearly represented and a colored inner area. In this case, the color of the inner area is suppressed and the vector element looks like a sketch image in the draft printing by a combination of the graphical elements having the modified border. In general, this approach does not work.

According to the present embodiment, the temporarily rasterized bitmap is applied in the conversion of each image into a sketch image in such a common and simple method. According to an exemplary embodiment, the temporary bitmap may be obtained through a MS-window GDI function and the rasterization is as follows:

That is, a "compatible device context" (CDC) and a "compatible raster image" (an internal bitmap of a memory) are prepared for a whole print page (by means of a GDI function). A metafile existing in the CDC is reproduced without text records. Accordingly, the internal bitmap (in an operating memory), which includes graphical elements without text blocks, is obtained. Also, the sketch image generation unit 140 directly detects the bounding area of the graphical primitive and suppresses the color of the inside of the bounding area of the graphical primitive. An auxiliary memory buffer corresponding to an internal memory bitmap for the whole page is allocated. Size and resolution of the whole page should be considered in estimating a volume of the buffer. An image of the whole page is transmitted to the auxiliary buffer from the internal bitmap. The buffer localizes the individual image (as a fragment of the whole page bitmap) and transmits the localized segment to an individual local buffer. For the localization of each segment, the coordinates of the bounding rectangle are used in the previous group of the graphical primitives. They correspond to the required boundary of the individual image in the page buffer. As a result, the local buffer includes the image which is represented as an individual raster image. Such an image is used as the sketch image.

The sketch image converting process includes the following operations according to the present embodiment. The method according to an exemplary embodiment is applicable to both a color and a grayscale image.

The embodiment of the present general inventive concept includes bitmap image preliminary enhancement, for example, a smoothing operation by a filter, image contrast enhancement, and determination of distinctive visual features of the image, for example, based on an importance map.

The color bitmap is converted into a grayscale copy. This operation may not be required when an original image is displayed in a grayscale mode.

An edge is detected for the grayscale image. The generated binary mask highlights this edge and suppresses other areas of the image. The detection of the edge may be performed by difference of Gaussians (DoG) filtering and introducing a threshold value of the resulting value.

The binary mask is applied in the bitmap for the determination of the edge. For the mask of the colored image, the binary mask is applied to each color channel. The mask preserves the image corresponding to only those pixels and the detected edge. As a result of this operation, the image is obtained and is regarded as a sketch.

As mentioned above, the generation of the sketch may be performed based on the preliminary bitmap generated. However, the present general inventive concept is not limited thereto. It is possible that the sketch is generated when the image includes vector graphical elements. In this case, generating the auxiliary bitmap and detecting the edge by filtering may not be required. When it is possible to create usable data, it is enough to suppress the coloring of the inner area of the vector graphical element and to detect the edge. In this case, the result (the sketch) appears as a collection of the graphical primitives along with the modified parameters rather than the sketch. However, this method may be selectively applied.

Accordingly, the resulting sketch is generated for each of the processed pictures when they are represented as a bitmap data according to the embodiment of the present disclosure. Each sketch is used for an output print job as a new graphical primitive instead of the original graphical primitives previously used for generating pictures. In the current embodiment, a new EMF-metafile may be created for this purpose. The sketch bitmap is included in the metafile through a corresponding graphic device interface (GDI) command. All of the other records of the input metafile (for example, a text object) are copied to the output printing job (metafile). The original graphical primitive used for generating picture and sketches may be excluded from the output metafile (at least a part of the primitive may be excluded). In the current embodiment, some of the primitives, for example, horizontal and vertical lines constituting the frame of the table may be optionally saved.

The print data generation unit 150 generates print data by replacing the bitmap image in the print job using the data converted into the monochrome sketch image. The sketch image generated in this way is used for draft-printing.

The print data generation unit 150 may modify the print data in part by including the original graphical primitive, which is represented by the horizontal and vertical lines, in the modified print data.

The communication interface unit 160 transmits the modified print data to an image forming apparatus. According to the current embodiment, the optional suppression is possible for the text and the graphic records of the modified print job. Finally, the modified print job is rasterized and is transmitted to the image forming apparatus, so that an image forming job is performed.

The above explanation is about modifying the initial print job by the print controlling apparatus 100.

Hereinafter, an image forming system, which performs draft-printing by converting an image having graphical primitives into a sketch image, will be explained. In the image forming system according to an exemplary embodiment, a print controlling apparatus 100 and an image forming apparatus 200 are connected to each other through a wired or wireless communication.

In such an image forming system, the print controlling apparatus 100 includes an extraction unit 120, an image generation unit 130, a sketch image generation unit 140, and a print data generation unit 150.

Initial (input) data is provided as a print job which is represented by a PDL or a metafile. The initial data may include records describing text data and graphical primitives. The output data is a print job which is modified to perform draft-printing. The modified print job is transmitted to the image forming apparatus 200.

The extraction unit 120 receives the print job and parses the print job into separate records. The extraction unit 120 extracts a graphical primitive and transmits the extracted graphical primitive to the image generation unit 130 and the print data generation unit 150. The extraction unit 120 extracts all of the other kinds of records and transmits the extracted records to the print data generation unit 150.

The image generation unit 130 generates an image by arranging the graphical primitives and grouping the graphical primitives according to geometrical vicinity. This is performed according to the above-described method. If limited rectangles of the graphical primitive overlap each other or are disposed close to each other (within a predetermined threshold distance), the graphical primitives are grouped. The image (the groups of the combined graphical primitives) is transmitted to the sketch image generation unit 140, which generates a sketch image.

The resulting sketch image (represented by the groups of the combined primitives) is transmitted to the image (picture)-to-sketch unit 140 (the sketch image in the present embodiment refers to a bitmap in which the edges are outlined and the inner coloring is suppressed). The resulting image is transmitted to the print data generation unit 150.

The print data generation unit 150 receives all of the records of the initial print job parsed by the extraction unit 120 and/or the sketch image generated by the sketch image generation unit 140. The print data generation unit 150 generates a modified print job represented a new metafile including a sketch image as a new bitmap record and/or the record optionally received from the extraction unit 120. The print data generation unit 150 optionally suppresses a specific type of a record. Since the sketch image is included in its output metafile, at least a portion of the graphical primitives used previously to generate the sketch image is suppressed. Simultaneously, a portion of the graphical primitives, for example, the horizontal and vertical lines constituting the table grid may be optionally saved.

The print data generation unit 150 transmits the modified print job to the image forming apparatus 200 through the communication interface unit 160.

The image forming apparatus 200 may receive the modified print job with the sketch image from an external apparatus and print the received modified print job on a print medium.

The image forming apparatus 200 may receive the modified print data from the print controlling apparatus 100 through the communication interface unit 160 to print an image corresponding to the modified print data on a print medium. Also, the image forming apparatus 200 may receive print data from the print controlling apparatus 100, modify the received print data, and generate the modified print data for draft-printing.

It is possible that the print data transmitted to the image forming apparatus 200 may include additional data or command to indicate whether the print data is a modified print job. According to status of the additional data, the image forming apparatus 200 may determine whether the transmitted print data is an original print data without sketching or a modified print data with sketching. The image forming apparatus 200 may perform either a printing operation to print an image on a print medium as draft-printing or a modifying and printing operation to modify the print data, according to the above-describe method and then print the modified print data according to the above-described determination.

Hereinafter, modifying print data by an image forming apparatus will be explained in detail.

Figure 18:
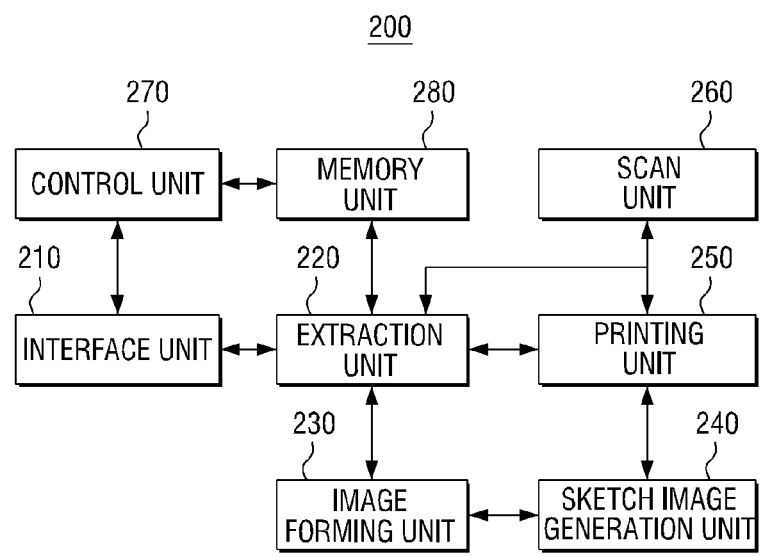
FIG. 18 is a block diagram illustrating an image forming apparatus according to an exemplary embodiment of the present general inventive concept.

FIG. 18 is a block diagram illustrating an image forming apparatus 200 according to an exemplary embodiment of the present general inventive concept.

Referring to FIG. 18, the image forming apparatus 200 includes an interface unit 210, an extraction unit 220, an image forming unit 230, a sketch image generation unit 240, and a print data generation unit 250. The image forming apparatus 200 may include a scan unit 260 to scan a document to generate print data. The image forming apparatus 200 may also include a control unit to control the above-described unit to perform a function of the image forming apparatus 200. However, the scan unit 260 may not be included in the image forming apparatus 200. It is possible that the image forming apparatus 200 may be connectable to an external scan unit 260 or an external device to receive the print data corresponding to the scanned document.

The image forming apparatus 200 may include a control unit 270 to control components of the image forming apparatus 200, for example, the interface unit 210, the extraction unit 220, the image forming unit 230, the sketch image generation unit 240, and the printing unit 250 so that a function of the image forming apparatus 200 can be performed according to an embodiment of the present general inventive concept. The image forming apparatus 200 may also include a memory unit 280 to store data associated with the function of the image forming apparatus. it is possible that the extraction unit 220, the image forming unit 230, the sketch image generation unit 240, and at least a portion of the printing unit 250 may be included in the control unit 270 such that the control unit 270 can perform the corresponding functions thereof.

The interface unit 210 receives print data from the print controlling apparatus 100. The interface unit 210 may print data from the scan unit which scans a document and generates the print data corresponding to the scanned document. And the interface unit 210 receives print data from an external print controlling apparatus.

The extraction unit 220 extracts at least one graphical primitive from the print job.

The image forming unit 230 forms an image by arranging the graphical primitives according to a determination of whether the extracted graphical primitives are disposed close to each other with a geometrical distance. That is, the image forming unit 230 generates a whole image by grouping the graphical primitives which overlap each other or are disposed close to each other within a predetermined distance.

The image forming unit 230 generates an image having one or more graphical primitives by iterating the grouping of the graphical primitives.

The image forming unit 230 detects a bounding area of the extracted graphical primitive, and, if the detected bounding areas overlap each other, groups the graphical primitives in the overlapping bounding areas by combining them into the image.

Also, the image forming unit 230 detects a bounding area of the extracted graphical primitive, determines whether a distance between the bounding areas of the extracted graphical primitives in coordinates falls within a predetermined distance, and, when the bounding areas overlap each other or the coordinate distance between the bounding areas falls within the predetermined distance, groups the graphical primitives by combining them into the image.

The sketch image generation unit 240 converts the image formed by the image forming unit 230 into a sketch image.

Figure 18A:
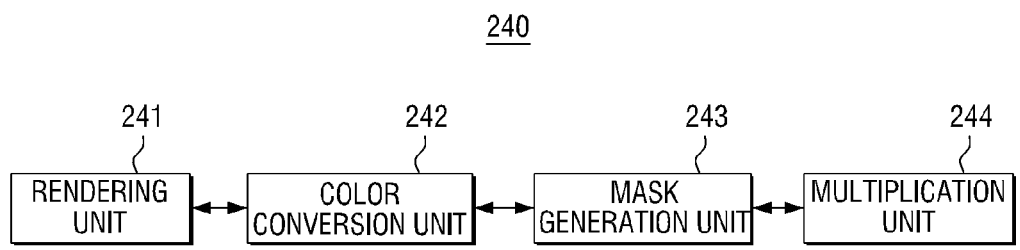
FIG. 18A is a view illustrating a sketch image generation unit of the image forming apparatus of FIG. 18.

Referring to FIG. 18A, a detailed configuration of the sketch image generation unit 240 is as follows: The sketch image generation unit 240 includes a rendering unit 241, a color conversion unit 242, a mask generation unit 243, and a multiplication unit 244. The sketch image generation unit 240 of FIG. 18A is similar to that of the sketch image generation unit 140 of the print controlling apparatus 100 of FIG. 16A described above and thus a detailed description thereof is omitted.

The printing unit 250 generates print data by replacing a bitmap image in the print job using data which is converted into a monochrome sketch image. The sketch image generated in this way is used for draft-printing.

The printing unit 250 may modify the print data in part by including the original graphical primitives represented by horizontal and vertical lines in the modified print data.

The methods according to exemplary embodiments of the present disclosure may be applied for an initial printing mode (a toner saving mode) in electrophotographic printers, ink-jet printers and MFP devices, and both monochrome and color ones. The above-described methods may be used in print drivers.

The methods are applicable to any print jobs represented in a metafile format (for example, EMF, MS-EMFSPOOL) or in a Page Description Language (such as PCL, PS, PDF, XPS) because all these formats contain records ("tags") describing text data, explicit bitmaps and vector graphics.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system.

Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming method of a print controlling apparatus, the method comprising:
   extracting two or more graphical primitives included in print data;
   forming an image by arranging the two or more graphical primitives according to a determination of whether the extracted graphical primitives are disposed close to each other;
   converting the formed image into a sketch image; and
   modifying the print data by replacing a portion of the graphical primitives, which corresponds to the sketch image, with the sketch image such that draft-printing is performed using the modified print data.

2. The image forming method of claim 1, wherein the forming the image comprises:
   detecting a bounding area of the extracted graphical primitives; and
   when the detected bounding areas overlap each other, combining the graphical primitives corresponding to the bounding areas overlapping each other into the image.

3. The image forming method of claim 1, wherein the forming of the image comprises:
   detecting an outer area of a bounding area of the extracted graphical primitive;
   determining whether a coordinate distance between the bounding areas of the graphical primitives falls within a predetermined distance; and
   combining the graphical primitives into the image when the bounding areas overlap each other or when the coordinate distance between the bounding areas falls within the predetermined distance.

4. The image forming method of claim 1, wherein the converting comprises:
   rasterizing the image which is represented by a group of the two or more graphical primitives into a bitmap; and
   converting the bitmap into the sketch image.

5. The image forming method of claim 4, wherein the converting the image into the sketch image comprises:
   converting the bitmap into a monochrome image;
   detecting an edge of the monochrome image and generating a mask; and
   generating the sketch image by multiplying the bitmap image with the mask.

6. The image forming method of claim 1, wherein the converting the image into the sketch image comprises:
   detecting a bounding area of the graphical primitives and highlighting a contrast; and
   suppressing a color included in an inner area of the graphical primitives.

7. The image forming method of claim 1, wherein the modifying the print data comprises modifying the print data in part by including original graphical primitives, which is represented by horizontal and vertical lines, in the modified print data.

8. A print controlling apparatus usable with an image forming apparatus, the print controlling apparatus comprising:
   a user interface unit to receive a print command regarding a print job;
   an extraction unit to extract two or more graphical primitives included in print data which corresponds to the print job;
   an image forming unit to form an image by arranging the two or more graphical primitives according to a determination of whether the extracted graphical primitives are disposed close to each other;
   a sketch image generation unit to convert the formed image into a sketch image;
   a print data generation unit to modify the print data by replacing a portion of the graphical primitives, which corresponds to the sketch image, with the sketch image; and
   a communication interface unit to transmit the modified print data to the image forming apparatus.

9. The print controlling apparatus of claim 8, wherein the image forming unit detects a bounding area of the extracted graphical primitives, and, if the detected bounding areas overlap each other, combines the graphical primitives corresponding to the bounding areas overlapping each other into the image.

10. The print controlling apparatus of claim 8, wherein:
    the image forming unit detects a bounding area of the extracted graphical primitives, and determines whether a coordinate distance between the bounding areas of the extracted graphical primitives falls within a predetermined distance; and
    the image forming unit combines the graphical primitives into the image when the bounding areas overlap each other or when the coordinate distance between the bounding areas falls within the predetermined distance.

11. The print controlling apparatus of claim 8, wherein the sketch image generation unit comprises:
    a rendering unit to rasterize the image which is represented by a group of the one or more graphical primitives into a bitmap;
    a color conversion unit to convert the bitmap into a monochrome image;
    a mask generation unit to detect an edge of the monochrome image and to generate a mask; and
    a multiplication unit to generate the sketch image by multiplying the bitmap image with the mask.

12. The print controlling apparatus of claim 11, wherein:
    the color conversion unit converts the generated sketch image into a monochrome image; and
    the print data generation unit generates the print data by replacing the bitmap image in the print job with the monochrome image.

13. The print controlling apparatus of claim 8, wherein the sketch image generation unit directly detects a bounding area of the graphical primitive and suppresses a color inside the bounding area of the graphical primitive.

14. The print controlling apparatus of claim 8, wherein the print data generation unit modifies the print data in part by including an original graphical primitive, which is represented by horizontal and vertical lines, in the modified print data.

15. An image forming apparatus usable with a print controlling apparatus, comprising:
   a communication interface unit to receive print data;
   an extraction unit to extract two or more graphical primitives included in the print data;
   an image forming unit to form an image by arranging the two or more graphical primitives according to a determination of whether the extracted graphical primitives are disposed close to each other;
   a sketch image generation unit to convert the formed image into a sketch image; and
   a printing unit to modify the print data by replacing at least a portion of the graphical primitives, which corresponds to the sketch image, with the sketch image, and to perform draft-printing using the modified print data.

16. The image forming apparatus of claim 15, wherein the image forming unit detects a bounding area of the extracted graphical primitives, and, when the detected bounding areas overlap each other, combines the graphical primitives corresponding to the bounding areas overlapping each other into the image.

17. The image forming apparatus of claim 15, wherein the image forming unit detects a bounding area of the extracted graphical primitives, and determines whether a coordinate distance between the bounding areas of the extracted graphical primitives falls within a predetermined distance, and combines the graphical primitive into the image if the bounding areas overlap each other or when the coordinate distance between the bounding areas falls within the predetermined distance.

18. The image forming apparatus of claim 15, wherein the sketch image generation unit comprises:
   a rendering unit to rasterize the image which is represented by a group of the at least one graphical primitive into a bitmap;
   a color conversion unit to convert the bitmap into a monochrome image;
   a mask generation unit to detect an edge of the monochrome image and generates a mask; and
   a multiplication unit to generate the sketch image by multiplying the bitmap image with the mask.

19. The image forming apparatus of claim 15, wherein the sketch image generation unit directly detects a bounding area of the graphical primitive and suppresses a color inside the bounding area of the graphical primitive.

20. The image forming apparatus of claim 15, wherein the printing unit modifies the print data in part by including an original graphical primitive, which is represented by horizontal and vertical lines, in the modified print data.

21. The image forming apparatus of claim 15, further comprising:
   a scan unit to scan a document and generates the print data, wherein the interface unit receives the print data from the scan unit.

22. The image forming apparatus of claim 15, wherein the interface unit receives the print data from the print controlling apparatus.

23. A non-transitory computer readable medium to contain computer-readable codes as a program to execute the method of claim 1.

* * * * *